United States Patent [19]
Randall et al.

[11] Patent Number: 5,452,417
[45] Date of Patent: Sep. 19, 1995

[54] REAL TIME DISPLAY SYSTEM FOR SHOWING THE STATUS OF AN OPERATING SYSTEM

[75] Inventors: Jeffrey C. Randall, Minneapolis; Anil K. Gowda, Eden Prairie; McCarthy Timothy F., Plymouth; Edward L. Schwarz, Minneapolis, all of Minn.

[73] Assignee: Honeywell Inc., Minneapolis, Minn.

[21] Appl. No.: 155,900

[22] Filed: Nov. 23, 1993

[51] Int. Cl.6 .............................................. G06F 15/00
[52] U.S. Cl. ................................. 395/162; 395/550; 395/700
[58] Field of Search ................. 395/162–166, 395/550, 575, 700; 345/24, 55, 133, 189; 364/280, 877.5, 976

[56] References Cited

U.S. PATENT DOCUMENTS

| | | | |
|---|---|---|---|
| 3,787,860 | 1/1974 | Greatline et al. | 342/401 |
| 4,162,493 | 7/1979 | Ross et al. | 345/59 |
| 4,464,120 | 8/1984 | Jenson | 434/219 |
| 4,600,807 | 7/1986 | Kable | 345/173 |
| 4,991,176 | 2/1991 | Dahbura et al. | 371/27 |
| 5,276,798 | 1/1994 | Penalee et al. | 395/162 |

*Primary Examiner*—Mark R. Powell
*Assistant Examiner*—Kee M. Tung
*Attorney, Agent, or Firm*—Edward L. Schwarz

[57] ABSTRACT

A display system provides a real time display on its display screen of the present and recent past operating history of an operating system. The operating system provides a signal to the display system in real time which encodes the current operating state of the operating system. For each operating state, a line is displayed in the display screen at a coordinate position which associates the line with the operating state. Each of these lines is coordinated with a time scale running along the screen which indicates the actual time intervals during which the various states existed.

12 Claims, 10 Drawing Sheets

REAL TIME DISPLAY SYSTEM FOR SHOWING THE STATUS OF AN OPERATING SYSTEM

BACKGROUND OF THE INVENTION

The industrial and commercial activities of modern businesses are characterized by the use of large and complex systems of various types. Chemical and manufacturing operations employ operating systems of various types in the manufacturing and environmental aspects of these businesses. For example, a chemical plant may require an operating system to direct the execution of various steps in the process necessary for the production of various chemicals. As the product, efficiency, and quality demands on these systems have become greater, the systems themselves have become much more complex.

To respond to this additional complexity, there has been an increasing tendency to rely on computer-based control of such systems' operation. The increasing power and reliability of small personal computers whose cost has drop steadily meanwhile has only speeded this transition. The use of computer control itself allows added complexity and speed in the operations involved, with the result that the humans responsible for these operations have become increasingly less able to determine directly their status.

It is axiomatic that it is necessary to analyze the operation of complex systems throughout their life. During installation, it is necessary to analyze operation in order to detect installation errors. During normal operation, it is necessary to monitor the processes involved in order to determine degradation and failures of individual components and flaws in both input and output product. If faults in operation are detected, then it is necessary to closely monitor the operation in order to efficiently and accurately sense the cause of the faulty operation.

This analysis typically is based on individual sensors or other indicators of the various aspects of the operations, and then the magnitude (or existence) of each condition is provided for the human operator. The human operator then could infer from these conditions what the status of operation is, and can take appropriate steps when problems are indicated.

Among the most important conditions which indicate system operation are simply the current and past operating states of the system. By the term "operating state" in this context is meant the particular phase or type of operation in which the system is engaged. The invention to be described was developed for the purpose of controlling the operation of large burner systems, and for this reason it is convenient to explain operating states of a typical operating system and the invention itself in relation to burner systems.

In burner systems, the standby state is one operating state, and indicates the burner is idle, not providing heat for the process or space. A normal operating sequence is initiated when there is a demand for heat. In the first operating state, the burner enters a purge phase where a blower forces air through the combustion chamber to assure that the blower is operational and there are no combustible vapors in the chamber. From the purge state, the burner enters an ignition operating state where the igniter is enabled. After the igniter has been enabled, then the burner enters its pilot state where the pilot fuel valve is opened, and the pilot flame is established. Once the pilot flame is established, the igniter is disabled. Then the main valve is opened, and for a period a pilot and main operating state exists. Then the pilot valve is typically closed, and the main only operating state is entered. After the demand for heat has been satisfied, the main valve is closed, and the blower is allowed to run for a further period, which forms a second purge operating state. After the second purge state is complete, then the system returns to the standby operating state. If any malfunctions occur during this sequence, these create other operating states as well. Thus it can be seen that for even a simple large burner system a number of different operating states can exist.

For a number of reasons, simple visual inspection of operating systems such burner systems is ineffective in determining operating states. Where systems are physically large, a number of tours of the system are necessary to determine the operating states. The operator will be able to gain only a rough idea of when a particular operating state ends and another begins. Where there are a large number of operating states, it becomes laborious to track and record the operating states. Where individual operating states are of short duration, visual inspection of the system and gauges may not detect their existence. If a combination of conditions are necessary to constitute an operating state, (such as the main and pilot valves both open) it may be complicated to determine. In other cases, the timing or phasing of changes in indicators is the important factor in establishing presence of a fault. Even if phasing of indicator changes is not important in determining the presence of a fault, phasing may still be important in diagnosing the cause of a fault. Further, changes in phasing may indicate deterioration of particular system components, whose early detection allows correction during routine maintenance, or at least allows avoiding expensive failure during operation, where damage or injury may occur.

Accordingly, some way of collating or collecting these indicators and presenting them in a way which is instantly understandable and useful is extremely desirable.

SUMMARY OF THE INVENTION

We have found that it is possible to provide a real time indication of the status of an operating system with a display system which presents the current and past states in a way which relates them to each other timewise. Such a display system is intended to display the state history of an operating system as previously described. These operating systems have first through at least second different and mutually exclusive operating states and change from one operating state to another at unpredictable instants. Each of these operating states is defined by an associated unique value encoded in a state signal supplied in real time by the operating system.

In our preferred embodiment this display system is implemented by a small microcontroller of the type used as the computational element in the commonly available personal computers, and which may in fact be such a personal computer. The various functional components of the invention itself are either dedicated parts of the computer hardware, or are formed by executing the appropriate software instructions within the microcontroller element of the computer. In our preferred embodiment, we have used such a personal computer as the platform on which the invention is implemented. We used one having Microsoft (trademark of Microsoft, Inc.) Windows as the operating system and a keyboard and mouse as input devices for the operator. The capabilities and hardware structure of such personal computers is now well known to those having skill in the art. Such persons of skill are also very familiar with designing and developing programs for these personal computers. In the summary of the invention's structure which follows, a number of the elements of such personal computers are seen to form elements of this invention as well, and these are described in detail adequate to understand the invention.

The invention includes a display screen of the type commonly found as a hardware part of a personal computer system monitor and which includes an orthogonal matrix of pixels forming a raster in which a raster image providing a visible display of information can be produced by altering the luminance of the individual pixels. The display screen receives a raster signal encoding raster data for each of the pixels in the display screen. The display screen includes display circuitry which periodically provides for each pixel in the raster image a bit value assigned to that pixel from the raster signal, which specifies the luminance desired for that pixel. The individual pixels of these display screens have at least two states of luminance and whichever of these states is specified by the raster signal is retained for a limited time, which is longer than the time period until the display circuitry again provides a bit value to an individual pixel. In this way the display screen can display a particular image which changes over time and yet appears to the viewer as continuous in the short term.

Those familiar with personal computers also are aware that they include a raster memory comprising a plurality of bit storage locations each of which is assigned to a predetermined pixel in the raster image and records a bit value assigned to that pixel. The raster memory records values in the individual bit locations as specified by a display signal supplied to the raster memory, typically from the microcontroller. At periodic intervals, typically 30 or 60 times per second, the raster memory provides to the display screen the raster signal encoding the bit values recorded in the bit locations. The display circuitry then paints the individual pixels, i.e., sets them to the luminance dictated by the bit value in the raster memory bit location assigned to that pixel. If the display is in color or individual pixels have more than one luminance level, then there will be more than one bit location in the raster memory assigned to a single pixel.

To implement the invention, a portion of the bit locations in the raster memory are grouped in first through at least third pluralities. All of the bit locations in the first plurality are assigned to pixels aligned in a first approximately straight line in the raster image. All of the bit locations in the second through at least third pluralities are assigned to pixels aligned respectively in second through at least third approximately straight lines in the raster image, where the second through at least third approximately straight lines are parallel to the first approximately straight line.

A clock element, which may be the internal clock of the computer, provides a clock signal specifying the present time of day.

The microcontroller executes instructions stored in a software instruction memory. These instructions allow the microcontroller at various times to function as a number of different functional elements. Signals are transmitted between these functional elements by recording in an operand memory forming a part of the microcontroller, data representative of the values encoded in the signal involved while the microcontroller functions as the particular element. When the element which is to receive that signal comes into existence by virtue of the microcontroller executing the instructions which invoke that element, the microcontroller reads the data stored in the location of the operand memory and uses it in performing the function intended.

In one mode these elements cooperate to produce display signals which create in the raster memory, a set of raster data which displays in the display screen a graph on which is traced a pattern indicating the current and immediate past states of the operating system. The raster data changes with time in this mode as the operating system changes its state.

One set of these instructions executed by the microcontroller cause the computer to function as an origin time means which generates and records an origin time value and which issues an origin time signal encoding the origin time value.

Another set of instructions executed by the microcontroller cause the computer to function as a time reference line generator means receiving the clock signal and origin time signal. The microcontroller while functioning as this means provides to the raster memory a display signal which first, encodes values setting bit locations to predetermined values within the raster memory assigned to pixels of the first plurality. These pixels have preassigned positions in the raster image and when adopting the luminance specified by the contents of the bit locations assigned to them, form time marks in the raster image. The display signal provided by this means also encodes values setting to predetermined values within the raster memory, bit locations assigned to pixels which form within the raster image adjacent to a time mark a text image spelling out the origin time value. The origin time value and said time marks together define a time scale representing a time interval within which is included the present time of day.

Execution of other instructions causes the microcontroller to form a label generator means for forming labels adjacent to the second through at least third straight lines. The label generator means provides to the raster memory a display signal encoding values setting to predetermined values within the raster memory, bit locations assigned to pixels which, adjacent to each of the second through at least third straight lines, form a text image spelling out for each of the second through at least third lines a state name comprising a label for the respective line.

Further software instructions are executed to form a state indicator means which actually generates on the display screen a trace in real time which indicates the current and recent past states of the operating system. While functioning as the state indicator means, the microcontroller uses the state signal and the clock signal to provide to the raster memory a display signal encoding values setting, as a function of the present values encoded in the clock signal and the state signal, selected bit locations in the second through at least third pluralities to preselected values.

In this manner, individual bit locations of the raster memory are set to values causing the display screen to indicate the current state of the operating system. As time elapses, succeeding bits in the appropriate one of the second through at least third plurality of bits are set according to the current value of the clock signal. A person who wishes to learn the recent operating history of the operating system need only briefly examine the trace on the display screen.

DESCRIPTION OF THE PREFERRED EMBODIMENTS

Figure 1:
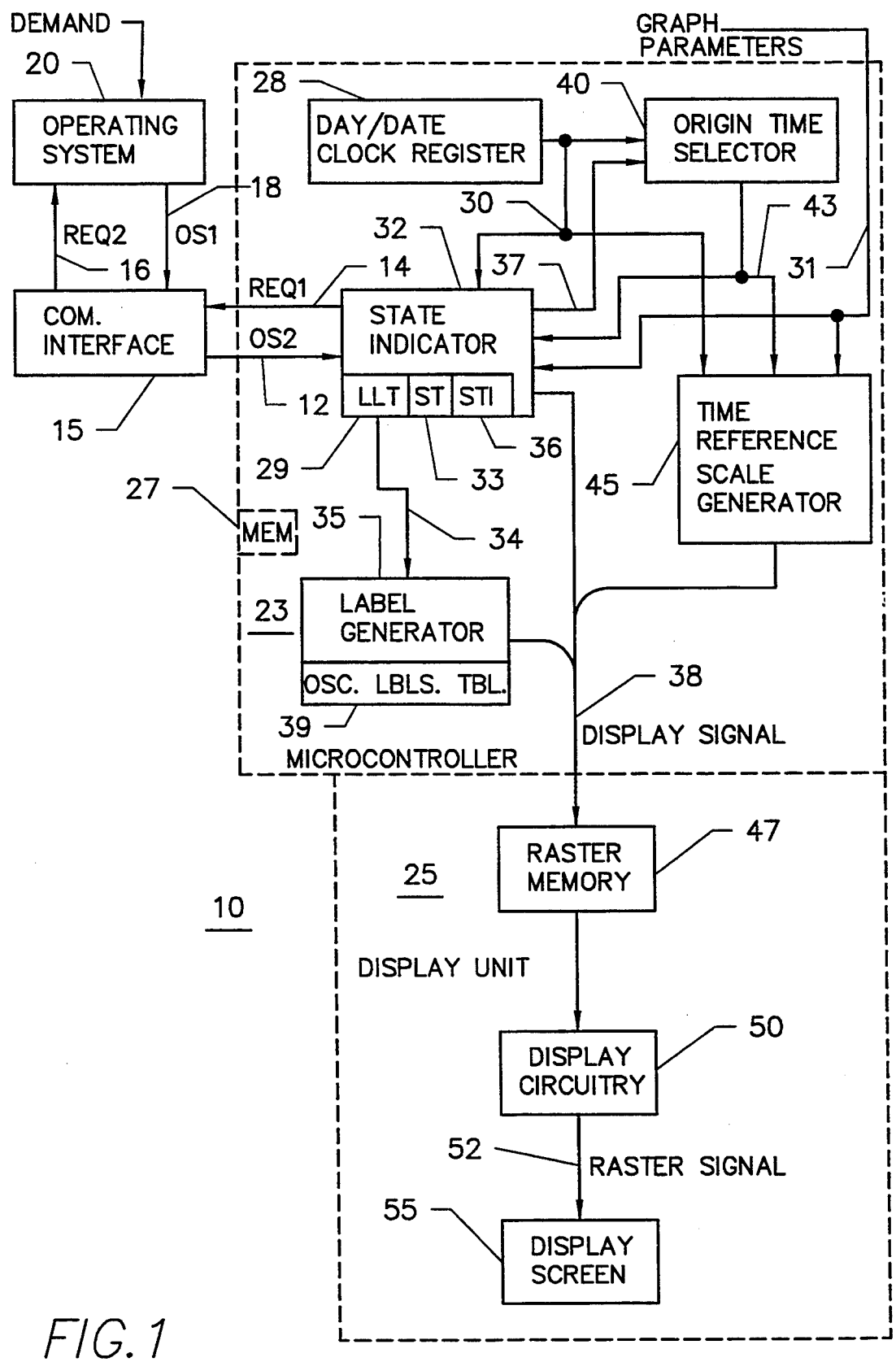
FIG. 1 is a block diagram of the display system showing the major hardware and software functional elements.

FIG. 1 shows a block diagram of a display system 10 for presenting a graphical image which tracks the operating state history of an operating system 20. The current operating state is indicated by an operating state signal provided on path 18 in response to a request signal on path 16. In the typical arrangement, the operating system 20 is remotely located from the display system 10, and communication between them is via a communication interface 15 which may be an amplifier or modem. In such an arrangement, a component of display system 10, state indicator element 32, transmits a first request (REQ 1) signal on path 14 to interface 15. Interface 15 then responds by transmitting a second request (REQ 2) signal on path 16 to operating system 20. Operating system 20 answers the REQ 2 signal with a first operating state (OS 1) signal on path 18. The interface 15 retransmits the OS 1 signal as a second operating state (OS 2) signal on path 12 to the state indicator element 32 part of display system 10. In this way the operating system 20 periodically supplies a sample of the operating system's operating state to the display system 10.

As mentioned above, a burner system is used as the exemplary operating system 20, and is assumed here to have just five distinct operating states, STANDBY, PILOT, RUN, RUN TRANSITION, and LOCKOUT, each indicated by a different signal pattern carried on path 12. A typical burner system may have as many as a hundred different operating states which may exist at one time or another, but for illustrative purposes, five is ample. A normal operating sequence for a burner includes the PILOT, RUN TRANSITION, and RUN states. The STANDBY state exists when the burner system is ready and able to start an operating sequence but is otherwise inactive. The PILOT state exists when the pilot flame fuel valve is open and the pilot flame, used for igniting the main flame, is either lit or in the process of being ignited. (The pilot ignition state during which the pilot light, if not of the standing pilot type, is lit.) has been omitted in this example.) The RUN state exists when the main fuel valve is open and the main flame is burning, and can be indicated by a high voltage level on path 16. There is typically a short overlap between the PILOT and RUN states, and this constitutes a fifth state, designated as the RUN TRANSITION state. The LOCKOUT state is entered if the control element in the operating system 20 detects an error of any type which requires human intervention. In the LOCKOUT state both the pilot and main fuel valves are closed, and it is not possible for an operating sequence to begin until the system has been reset manually. It is convenient to assign a unique operating state code (OSC) to each of the operating states which can exist for the operating system, and it will be assumed hereafter that the signals carried on path 12 encode the OSC for the current operating state.

The invention is implemented in a personal computer 10 which comprises two major hardware subsystems, the microcontroller 23 and its associated circuitry, and a display unit 25. As briefly mentioned above, another microcontroller has charge of the operating system 20 operation. The operating system microcontroller senses or generates the various operating states of system 20 and provides the signal on path 18 for microcontroller 23.

Display unit 25 typically comprises the video memory and familiar monitor of a personal computer. This monitor is shown as display screen 55 and display circuitry 50, and the video memory forms the raster memory 47. The screen 55 comprises a rectangular matrix of pixels, and in the common VGA configuration, has 640 horizontal pixel positions and 480 vertical pixel positions. Raster memory 47 has at least one bit location assigned to each of the display screen pixels. As was explained above, the luminance of any pixel in the display screen can be altered by changing the data recorded in a location of the raster memory 47 assigned to that pixel, thereby causing the appearance of that individual pixel to contrast with those around it. The raster memory 47 records in its bit locations the information provided by a display signal carried on path 38. The display signal by the relative positions occupied by the individual bits, or by coordinating addresses, specifies the bit locations in the raster memory 47 in which the display signal bit values are to be stored. By providing a display signal on path 38 which properly sets the bit location values in raster memory 47, any image desired which is within the capability of display screen 55 can be formed thereon. Display circuitry 50 periodically reads the data recorded in raster memory 47 and creates the luminance for each pixel in display screen 55 specified by the contents of the bit locations assigned to it.

The display signal is provided by the microcontroller 23, which has loaded in its memory 27, instructions whose execution cause microcontroller 23 to comprise at various times a number of the elements shown within microcontroller 23. As the microcontroller 23 executes the instructions which configure it as one or another of the elements shown as connected to the display signal path 38, portions of the display signal are generated by that element. The portion of the display signal so generated provides the data to raster memory 47 which sets the bit locations of memory 47 to the values which create the image components which that element has been designed to construct.

The preferred embodiment of this invention is designed to run under Microsoft Windows 3.1, where the X and Y coordinates for the pixels are specified with reference to a display origin pixel defining the lower left hand corner of the window rectangle in which this invention produces its display. When raster data is generated for display, the Windows interface software properly relates the coordinates for the raster data to the location in display 55 of the window in which the invention constructs its image and its display origin pixel. No further notice need be taken of these coordinate transformations as they are well known to those familiar with the Windows interface. If the invention is implemented in a non-Windows environment, the display origin pixel will be assumed to be the bottommost and leftmost pixel in the display screen 55.

The Windows environment also provides convenient text generation and line drawing software functions. The former accepts packets comprising a sequence of ASCII codes which spell out the text of a desired message along with the coordinates at which the text is to be positioned in display screen 55, and the characteristics of the text characters (font, size, color, etc.), as inputs to the text generator software. The text generator automatically forms and loads into raster memory 47 the raster data which alters the luminance of pixels to generate the raster image of the text in display screen 55, positioned according to the specifications of the input packet. In the line drawing function, the X and Y coordinates of the two ends of the line along with the characteristics desired for the appearance of the line are provided in the input packet. The line drawing function then loads raster memory 47 with the data which alters the luminance of display screen pixels to produce the specified line. No further notice need be taken of these capabilities, as they are well known to those familiar with the Windows environment.

The day/date clock register 28 forms a part of the hardware of every personal computer microcontroller, and provides a clock signal on path 30 which encodes the current time of day. Internal circuitry periodically updates the value in the clock register 28 to provide an accurate indication of the current time of day. The clocks provided by standard personal computers now available update their clock register 28 contents at least once a second.

Figure 2:
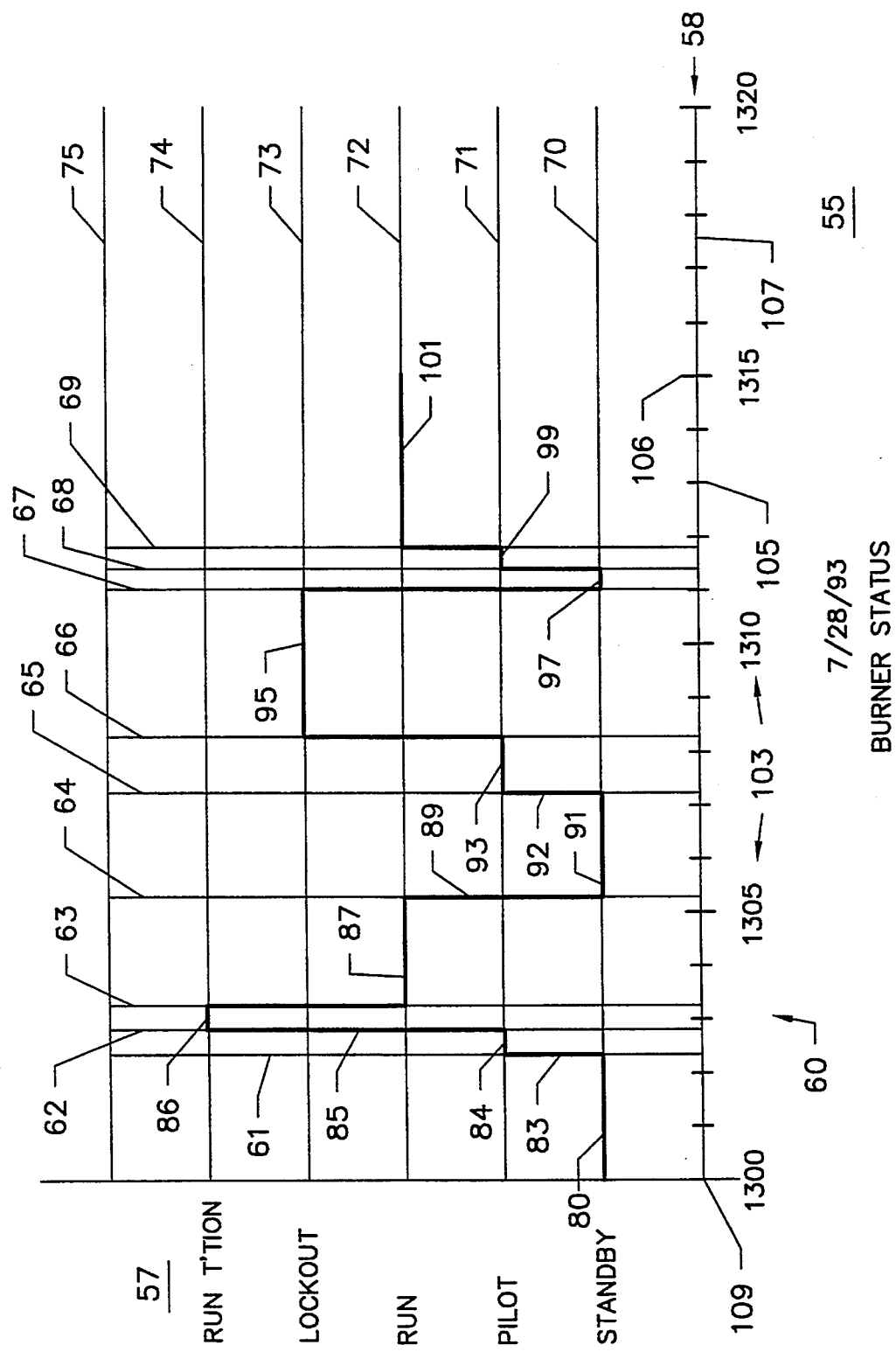
FIG. 2 is a sketch of a representative raster image which might be created on the display screen by a system implementing this invention.

In order to understand the remaining elements of microcontroller 23, it is helpful to first review and understand the information and format of the actual image which this invention presents on display screen 55. FIG. 2 shows a representation of a portion of the pixels forming display screen 55, with a representation of a typical image 60 formed in these pixels by the invention. In this image, a time reference scale 58 is created by a time scale line 107 representing a plurality of pixels aligned in a straight horizontal line, and whose luminance has been altered relative to the pixels adjacent. The time scale 58 represents the time interval between an origin time (not to be confused with the origin pixel of the display screen 55 or a window in it) represented by an origin time pixel 109 at the left end of line 107 and the termination time at the right end of line 107. Line 107 is intersected by a number of vertical time marks 105 and 106 also formed of pixels of altered luminance, each time mark 105 and 106 indicating a different time of day in a continuous interval represented by time scale 58. The luminance of pixels adjacent to the major time marks 106 is altered to form the text of a time legend as shown at 103 indicating the times of day represented by these major time marks 106. Thus, the left end pixel 109 of the time scale has the time 1300 hrs. (1:00 PM) indicated as the origin time, and the complete scale covers the 20 minute interval to the termination time of 1320 hrs. Other interval lengths for the time scale are suitable of course. The current date may also be displayed adjacent the time scale as shown. The Windows operating system allows for easy change of the various parameters which control the appearance of the image.

Other pluralities of pixels relevant to the image displayed here are represented by the relatively fine horizontal lines 70-75 and vertical lines 61-69. The reader should understand that in an actual display, the relatively fine portions of lines 70-75 and 61-69 will not be distinguishable from the surrounding pixels. There are of course many other pixels between those shown which form both horizontal and vertically oriented lines, and which may be employed when a different set of operating state information is being displayed. Each of plurality of pixels which define one of the lines 70-75 lie in a straight line parallel to the line formed by the pixels of line 107. In a commercial embodiment of this invention, there is as mentioned above, space provided for up to ten pluralities of pixels which define horizontal lines similar to lines 70-75.

Segments of these lines 70-75 as at 80 and 84 for example shown darker and heavier than the remainder of lines 70 and 71, represent pixels in the pluralities for lines 70 and 71 having luminance which is altered relative to the other pixels in that line and also relative to pixels above and below that line. A similar comment is true relative to vertical lines 62 and 63 for the vertical line segments shown at 83 and 85 for example. The pixels of display screen 55 forming the line segments having altered luminance create the image which is the purpose of this invention. Lines 70-75 and 62-69 will not normally be visible on a display screen 55, and are shown in order to represent the various pluralities of pixels from which is formed the display created by this invention.

Other of the pixels generally in area 57 adjacent the left ends of lines 70-75 form text images spelling out an operating state name for certain of the horizontal lines 70-75. A state name is present for a particular line 70-75 only if a portion of the pixels defining that line have the altered luminance as at line segments 80, 83, etc. A different state name is assigned to each value for the state signal. A table is provided which specifies for each possible state signal value, the state name assigned to that state signal value.

The various line segments having altered luminance and which coincide with lines 70-75 and lines 62-69 present an image forming a history of recent burner status. Their image on display screen 55 will be referred to hereafter as a history trace. Line segments 80, 84, 87, 91, 93, 95, 97, 99, and 101 represent the times when the operating state whose label appears by the line 70-75 of which the line segment forms a part, exists. Thus, the history trace of FIG. 2 shows that the STANDBY operating state has existed from 1300 hrs. to approximately 1302.20 hrs., 1305.20 hrs. to 1307.20 hrs, and 1311 hrs. to 1311.20 hrs. as indicated by line segments 80, 91, and 97. The PILOT operating state has existed for the time intervals defined by line segments 84, 93, and 99. The RUN TRANSITION operating state existed just once from 1302.8 hrs. to 1303 hrs. There has been a single LOCKOUT operating state which commenced at 1304.2 hrs. and ended at 1306 hrs. There have been two RUN states which commenced at 1303 hrs. and at 1311.30 hrs, as indicated by the line segments 87 and 101. Note that the line segment 101 ends at 1315 hrs., indicating that the operating state at the current time of 1315 hrs. is RUN. Vertical line segments 83, 85, 89, 92, etc. provide continuity in the appearance of the history trace, but are unnecessary in terms of the actual information content.

The history trace is developed from periodic sampling of the state signal provided on paths 12 and 18. At each sampling time the current value of the state signal is recorded with the current time in a sample table (ST) held in the computer memory, and from the accumulated information in the sample table, the history trace can be developed. The time between each instant when a sample value is recorded is preferably under user control.

A person familiar with burner operation can inspect the history trace in FIG. 2 to determine that there was a first operating sequence comprising the STANDBY state of segment 80, a normal PILOT state of segment 84, a short RUN TRANSITION state, and a normal RUN state of segment 87, followed by a return to STANDBY state at segment 91. In the next operating sequence, the PILOT state existed for almost a minute, indicating that either pilot or main ignition did not occur, followed by the abnormal LOCKOUT state. One can infer that a human operator intervened and fixed the problem, after which the control went through a normal startup sequence which terminated in the RUN mode. This mode still exists at the time of this example, inferable from the fact that segment 101 terminates with no vertical line segment connecting it to another horizontal line segment. One can also infer that current time at which this history trace was reproduced as it appears in FIG. 2 is 1315 hrs.

While the graph image of FIG. 2 is shown with a time scale line 107, it is not always necessary in point of fact to even have a line 107 since the time marks 105 and 106 and the time point texts 103 may adequately delineate the vertical elevation of each of the lines 70-75. If however, there are a number of lines 70-75 present and the history trace frequently changes between them, the relative elevations of each line is more easily determined by the observer.

In FIG. 1, microcontroller 23 is shown as comprising a number of individual elements which implement the invention. While it is possible to provide actual discrete circuits for each of these functional elements, for a variety of reasons the preference is instead to implement all of the functions shown as internal to microcontroller 23 as software. These reasons include reduced product cost, more rapid and less costly development, and greater upgrade flexibility. While executing sets of these instructions related to particular functions of these elements, microcontroller 23 physically becomes these elements for each period of time the related instructions are executed. As a practical matter, it is not possible for a human to distinguish from an operational standpoint whether a particular function has been implemented as a hardware circuit or as software executed by a microcontroller.

As an example of this activity, while implementing this invention microcontroller 23 on occasion executes instructions which cause it to function as an origin time selector element 40. These origin time selector instructions cause microcontroller 23 to select an origin time of day value (OT) and record this value in a selected memory location of microcontroller 23. The act of reading this memory location arising from execution of other instructions actually creates a varying voltage on a data path 43 internal to microcontroller 23 which encodes the origin time value.

Two other elements not yet mentioned which are shown as internal elements of microcontroller 23 provide various portions of the data in raster memory 47 from which the history trace and graph is formed on display screen 55. These elements are a time reference scale generator element 45 and a label generator element 35. The state indicator element 32 already mentioned also provides data to the raster memory 47. All of these elements also in the preferred embodiment come into existence while the execution of appropriate instructions by microcontroller 23 occurs.

The time reference scale generator element 45 provides the portion of the display signal on path 38 which creates the altered luminance forming the image of time scale 58, including the time marks 105 and 106, the horizontal line 107, and the time legend 103 adjacent to individual time marks 106. When the time reference line generator instructions are executed, the display signal which is generated causes memory locations in raster memory 47 to record data which alters the luminance of the pixels forming the time scale 58. The time scale line 107 is formed by loading memory locations of raster memory 47 which control the luminance of a first plurality of pixels whose positions in display screen 55 define line 107. The location of this first plurality of pixels in display screen 55 is determined by time scale-related graph parameters furnished by the user. The time marks 105 and 106 are created by storing data in raster memory 47 which alters the luminance of short vertical lines of pixels spaced from each other along line 107 according to its length SL (in pixels) and the time interval which time scale 58 represents. The number and spacing of individual time marks 105 and 106 should be chosen to make it easy for the user to determine the time assigned to each vertical segment 83, 84, etc. of the history trace.

The various format features of time scale 58 are based on parameters for the most part supplied externally on path 31 by the user. Path 31 will typically be connected to the keyboard and mouse of the computer of which microcontroller 23 is a part, and these devices allow entry of each time scale parameter by the user. For convenience, each of these user-specified parameters involved with controlling the format of time scale 58 and graph image 60 generally, are defined in the Table I, following, with their abbreviations in parentheses:

Table I

Sampling interval (SI)—The time between successive samples of the state signal's value Scale length (SL)—The total length of line 107 in pixels Graph height (GH)—The vertical height in pixels between the time scale and the topmost horizontal line (75)

Samples displayed (SD)—The maximum number of state signal sample values to be displayed in image 60

Operating states displayed (OSD)—The maximum number of states which can be displayed at any instant; same as number of lines 70-75

Origin coordinates (XOP and YOP)—The X and Y coordinates of the origin time pixel 109 in line 107 as measured from the display screen or window origin pixel In the preferred embodiment, only the SL, GH, XOP and YOP parameters can be changed once the application begins generating the graph. XOP and YOP can be changed during execution of the application in line with the general principle of Windows allowing changing of the dimensions of a window at any time by use of the mouse. Of course, if either dimension of the image 60 is changed, the entire image must be reconstructed.

A parameter not specified by the user in general is the starting time for the time scale 58:

Origin time (OT)—The time of day assigned to the origin time pixel at the leftmost end of line 107; supplied automatically by either origin time selector element 40 or state indicator element 32 The abbreviations for these parameters are used below as the mathematical symbols for the values themselves in equations which follow.

Other pixel position coordinates necessary to form time scale 58 are derived from these values. The sample position SP is the horizontal displacement from the scale origin pixel measured in pixels, corresponding to time TOS at which a sample was taken. SP is given by the formula:

$$SP = SL \times (TOS - OT)/(SI \times SO) \quad (1)$$

The value of SP should be rounded to the nearest pixel position. SL, SI, and SD should be chosen so that $SL/(SI \times SD) > 1$ to prevent a situation where a single pixel position might be required to represent two different states. The expression $$XCP = XOP + SP \quad (2)$$

then defines the X coordinate XCP of a column of pixels relative to the display origin pixel in display screen 55 and which column of pixels is assigned to the time of day TOS used to calculate SP.

The columns of pixels defined by Eq. 2 for different values of TOS include the pixels forming the individual time marks 105 and 106. Once the values in the time legend 103 have been chosen, Eq. 2 can be used to properly position each of the major time marks 106 and the minor time marks 105 between the major marks. By creating contrasts adjacent to line 107 in the pixels for each column specified by Eq. 2 for each value selected for the time legend 103, each major time mark 106 can be generated in the time scale 58. The values expressed by the time legend at 103 of FIG. 2 adjacent to the major time marks 106 are then the value of the TOS used to compute the X coordinate of each of the time marks 106. There is a wide range of options as to how the TOS values which the legend displays are chosen. Typically, the time legend will include approximately half a dozen individual values but this of course depends on the value chosen for scale length SL since one will usually want to avoid crowding of individual values in the legend. The TOS values used will typically be multiples of five or ten of the time units employed for the sampling interval, and then major time marks 106 which designate major time points are labeled with juxtaposed text specifying the corresponding time of day values. The X coordinate of the left edge of each legend value text is given by XCP−TO, where XCP is the value calculated by Eq. 2 for the TOS involved and XTO is a text offset which aligns the legend value text with its associated time mark 106. The Y coordinate for the bottom of the legend value text is YOP−YTO where YTO is a text offset which positions the text with an appropriate spacing below the line 107. These raster patterns of the time value texts are then transmitted as part of the display signal on path 38 to raster memory 47 and loaded in memory locations thereof which causes the raster patterns to be displayed on display screen 55 with the juxtaposition as defined above to the related major time marks 106 as shown in FIG. 2. The actual process by which the positions for the major time marks 106 are chosen, and hence the time legends associated with each, is beyond the scope of this invention. The number of minor time marks 105 between each major time mark 106 is also a matter beyond the scope of this invention.

State indicator element 32 receives and records the operating state information, assigns individual operating states to lines 70–75 of FIG. 2, selects the value of the origin time, and generates the raster information which alters the pixel luminance in lines 70–75 to indicate the start times and duration of the operating states. The state indicator element 32 is shown in FIG. 1 as symbolically including a portion of the microcontroller 23 memory 27 in which is stored a line label table (LLT) 29 and a sample table (ST) 30. During operation, state indicator element 32 at selectable sampling instants, functions as a sample storage means which records in an OSC field of locations in the sample table (ST) 33, the operating state code (OSC) assigned to the operating system 20 state at each of these instants. The current time of day held in clock 28 at each of these instants is also loaded in the associated ST 33 location in a TOS field. ST 33 is preferably accessed with an index value shown here as the sample table index (STI) 36 which is incremented after each OSC value and current time value has been recorded in the ST. It is possible to calculate the time at which each sample is recorded in the ST from this index value, the SI, and the OT, but it is simpler and easier to record the current time in the TOS field of each ST entry, and this is preferred.

The line label table 29 records the operating state code currently assigned to each of the pluralities of pixels defining the horizontal lines 70–75 along with a start index to the first ST 33 entry recording the OSC assigned to that line and an end index to the last ST 33 entry recording the OSC assigned to that line.

It is necessary to change the origin time when certain conditions arise during the generation of the history trace. When an OSC value for the operating state signal carried on path 12 occurs which is not currently recorded in the LLT 29, then the state indicator element 32 assigns to that OSC, a line 70–75 to which previously no operating state was assigned. If all of the lines 70–75 have OSCs assigned to them, then the origin time is incremented sufficiently to remove the oldest OSC from the history trace and therefore from the LLT 29. In the embodiment we have currently developed, each time the origin time is changed for any reason, it is necessary to completely redraw the image graph 60. The new origin time is encoded in an origin time signal transmitted on path 37 to selector 40, and the new origin time becomes the origin time available on path 43. A new origin time is also generated in the origin time signal on path 37 when the ST 33 fills up due to the passage of time. In this latter case, we prefer to simply reset the new origin time to half the difference between the latest time displayed on time scale 58 and the origin time. This new origin time value $$OT(\text{new}) = OT(\text{old}) + (SI \times SD/2).$$

Label generator element 35 provides the text data for the labels in area 57 along the left hand side of the image shown in FIG. 2. There is a position in area 57 for a label text for each horizontal line 70-75 in FIG. 2. These label texts name or identify the various operating states whose existence is signified by the vertical position of the various segments of the history trace. The label texts describing every operating state contemplated for operating system 20 are recorded in the microcontroller 23 memory in an operating state code (OSC) labels table 39. There may be several OSC labels tables in a particular installation, in which case one of them at a time must be selected by the user. Each of the OSC labels tables 39 is organized so that the text assigned to a particular operating state can be accessed with the operating state code (OSC) assigned to that operating state. Each time LLT 29 is changed, label generator element 35 receives the new LLT entry and its index position YI in the LLT from state indicator element 32. For convenience, assume that the value of YI varies from zero to OSD−1. The label generator element extracts from the OSC labels table 39, the raster pattern for the label identified by the OSC value in the LLT entry on path 34, and supplies this raster pattern in the display signal on path 38. This raster pattern is positioned in the display signal so as to appear at a Y coordinate aligning it with the horizontal line of pixels 70-75 in which the portion of the history trace for the related OSC appears. The Y coordinate for the label text is given by YOP+YLO+(SH×YI)/OSD where YLO is an offset value to properly align the label text with the associated line 70-75 in which the occurrences of the OSC value for that label text are graphed.

FIGS. 3, 4, 5a-5c, and 6a-6c comprise a set of flowcharts defining sets of object code instructions for microcontroller 23. Each of these sets of instructions, when executed by microcontroller 23, causes the microcontroller to actually comprise one of the operating elements shown within the microcontroller 23 block for so long as those instructions are executed. Thus, executing these instructions causes microcontroller 23 to sequentially comprise the various elements of this invention. It is well known of course, that microcontrollers are in fact hardware devices. The object code instructions which causes microcontroller 23 to perform the various functions comprising the elements forming this invention in fact have physical existence within the microcontroller by virtue of being embedded in a physical ROM or recorded in a RAM from which each instruction is extracted as needed by the microcontroller 23. As the various instructions of this object code are executed, each of the elements shown in FIG. 2 come briefly into existence, and then disappear as another segment of code is executed which causes another element to exist. Data is transferred among the various elements by signals which cause data to be stored within either registers of the microcontroller 23 or in read-only memory (RAM) associated with the microcontroller. These data storage signals are shown by the various data paths connecting the elements of FIG. 2. While the data paths are shown as separate entities, they of course may be shared among the various other elements, and a single data path may at different times carry different of the signals shown. While it is of course possible to develop the individual elements and data paths shown in FIG. 2 as dedicated hardware elements, it is so much cheaper to use a microcontroller, both from the standpoint of initial development and when making upgrades and fixing errors, that the hardware-only approach is not favored by those having skill in these arts. Those skilled in these approaches to developing control systems are extremely familiar with small microcontrollers similar to those used in personal computers of all types, and no further notice of this preferred development expedient should be necessary.

The details of the object code is presented in this flow chart format in order to allow those skilled in the art to most easily develop object code suitable for developing versions of this invention within different microcontrollers. Those having commonly available programming skills will be able to develop their own versions of the necessary source code for a particular microcontroller from which the object code for implementing the invention may be generated.

The conventions used in the flow charts are well known. The rectangular boxes denote a group of instructions whose execution causes some type of computational, data transfer, or other non-decisional action. The hexagonal boxes denote a group of instructions performing a decision activity where execution of further instructions depend on the value of some variable specified within the box. The small round circles are connector elements which denote flow of execution from one to another group of instructions. The oval boxes in FIG. 3 contain comments describing the activities which follow in the path shown. The boxes are all connected by flow lines having arrows which indicate the order in which the instructions symbolized by the boxes are executed. By far the largest number of instruction groups implement the state indicator element 32. Unless otherwise stated or if the box's instructions clearly implement a part of the functions for label generator 35, origin time selector 40, or time reference scale generator, all of the instructions symbolized by the elements of these flow charts implement functions of the state indicator element 32.

A number of different variables are used in the explanation of the flow charts. Although a number of these have already been discussed in connection with the explanation of the elements of microcontroller 23, it is convenient to present all of the variables not already explained in Table I, in the following Table II:

Table II

Block move index (BLK)—The index which specifies the earliest entry in the ST 33 saved when replacing an entry in LLT 29

Current time (CT)—The present time of day

Line label table (LLT)—The table which designates the label aligned with each horizontal line 70-75 in graph 60

Last time used field (LTU field)—The field in an LLT entry which holds the index to the ST location for the latest point of the history trace for the line 70-75 associated with the LLT entry OSC labels table index (OTI)—An index variable which is set to the current OSC value and used to index the location in the OSC labels table 39 holding the text of the label assigned to the OSC value in the OTI Operating state code (OSC)—The unique code assigned to a particular operating state of the operating system 20

Present time variable (PT)—The time at which the latest sample was received

Redraw index (RDI)—An index to the ST which is used during the redrawing of the history trace after reconfiguration of the ST Sample time (SK)—The time at which the next interrupt to sample the OSC value occurs Sample table (ST)—The table holding the OSCs and times when sampled, which are displayed in the history trace Sample table index (STI)—The index value which designates the location in the ST which the next sample should be stored Time of sample (TOS) field—The ST field in which the current time is placed at the instant the sample is received Time point (TP)—The time value for any of the major time points 106

X coordinate label text offset (XLO)—The X coordinate offset in pixels of the raster pattern for the label text in area 57; horizontally aligns each label text to the left of the origin point of the graph X coordinate time text offset (XTO)—The X coordinate offset in pixels of the raster pattern for each time value text 103 position in time scale 58; horizontally aligns each time value text with the major time mark 106 which is associated with the text Latest X and Y coordinates (XL and YL)—The latest values calculated for the X and Y coordinates of the history trace Previous X and Y coordinates (XP and YP)—The immediately preceding XL and YL values Origin point X and Y coordinates (XOP and YOP)—The coordinates of the origin point pixel Y index variable (YI)—An index variable which designates the location of the latest sample's OSC in the LLT, and also the line 70-75 in which the sample is to be displayed X coordinate label text offset (YLO)—The Y coordinate offset in pixels of the raster pattern for the label text in area 57; vertically aligns each label text to the left of the origin point of the graph Y coordinate time text offset (YTO)—The Y coordinate offset in pixels below the time line 107 of the text for each time value text 103 position in time scale 58

Figure 3:
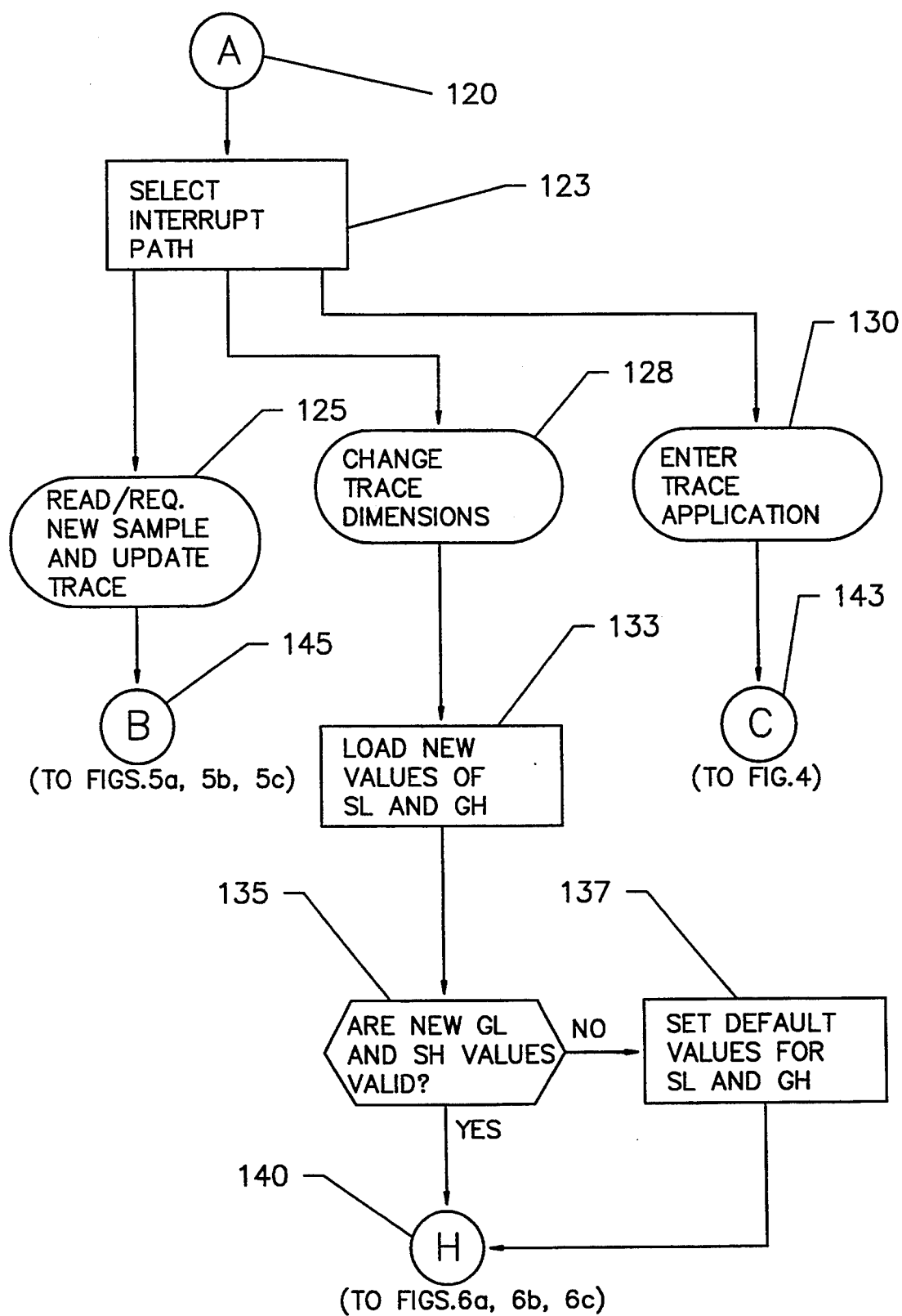
FIG. 3 is a flowchart defining software for configuring the microcontroller as an executive element for interfacing with a human operator and for sensing the presence of data specifying the operating states of the operating system.

Each of these variables are encoded in signals which are generated within microcontroller 23 and used by it to record the values in elements of memory 27 and to transmit the value of the variable to the appropriate processing elements for the operations specified by the various functions defined by the flow chart. Turning first to FIG. 3, the instructions symbolized here do not specifically form a part of the elements of microcontroller 23 shown in FIG. 1. Execution of all of the instructions forming a part of this invention begin at a connector element A 120 which will typically be entered from a master executive or upon first booting up the microcontroller and its associated components. Element A 120 represents the entry point to the instructions which implement the invention. Action box 123 symbolizes the instructions which enable and then process the interrupts by which entry to the instructions implementing the invention occurs. Action box 123 is thus a hybrid element which combines aspects of both action and decision, with the type of interrupt determining which of the three paths of instruction execution will be followed. (This is the only instance in this description where the instructions symbolized by an action box can select a path of instruction execution.) Two of these interrupts arise from a user input from a mouse or a keyboard, and the third from preset time expiring. When a user selects the trace application, the interrupt leads to the path through comment box 130 to connector C 143 and the instructions symbolized by the flow chart of FIG. 4. When the interrupt processing selects the path through comment box 125, the instructions directly involved with forming the image of FIG. 2 are executed. The path through comment box 125 is taken when the current time stored in the CT variable becomes larger than a sample time value stored in the SK variable. The instructions executed when this path is taken are symbolized by the flow charts of FIGS. 5a–c and 6a–c. When the interrupt selects the path leading to comment box 128, execution continues with the instructions of action box 133.

The execution path through comment box 128 allows the user to change the dimensions of the graph of FIG. 2. New values of SL and GH are provided by the user as a part of the interrupt activity and are loaded into the locations in memory 27 reserved for them. Decision box 135 symbolizes instructions which test the values for SL and GH to be within an acceptable range. If either value is not within the acceptable range, then that value is reset to a default value by the instructions of action box 137. Instruction execution then proceeds to connector H 140 which is the path for the instructions which cause the graph to be redrawn using the samples stored in ST 33.

Figure 4:
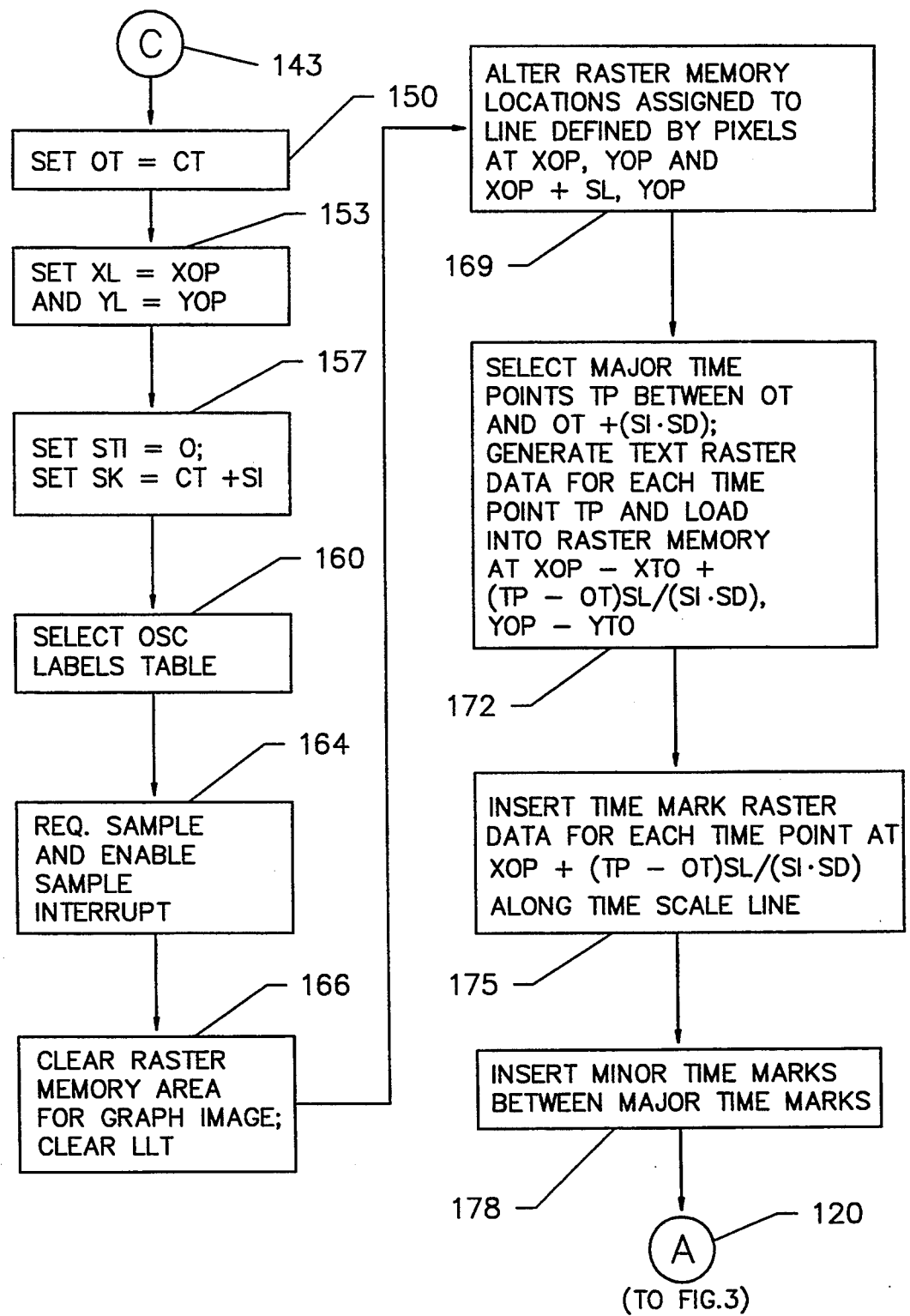
FIG. 4 is a flowchart defining software for configuring the microcontroller as elements allowing one to begin execution of the software implementing the invention.

FIG. 4 provides the flow chart whose instructions preset the various tables and variables for generation of the history trace and which generate the time scale 58. Action box 150 instructions set the origin time value OT to the current time value CT. Action box 153 instructions set the values of XL and YL to the coordinates of the origin time point 109, XOP and YOP respectively. A part of the instructions of action box 157 sets the sample table index STI to zero. The STI is held within microcontroller 23 in a sample table index register 36 which can be altered by a sample table index control signal generated by execution of the instructions of action box 157 as well as the other sets of instructions which involve the STI to be described later. It is assumed that successive locations in ST 33 have index values which differ by 1. This sample table index register also provides a sample table index signal encoding the STI value held in STI register 36. Another part of the instructions of action box 157 set the time of the first sample interrupt to the current time CT plus the sample interval value SI. This time allows an operating state sample to be requested and transmitted through interface 15 to microcontroller 23.

The instructions of action box 164 select the OSC labels table. There are several OSC labels tables stored in memory 27, and the one desired by the user is selected as the OSC labels table shown as ref. no. 39 in FIG. 2. A number of OSC labels tables 39 are required because there are a number of different sets of line label texts for insertion in area 57. Such different texts may arise for example because of different operating states for different operating systems 20 or because of different language requirements from one country to another. Typically, a default selection is provided by the instructions of box 160 if the user does not make a specific selection.

When the instructions of action box 164 are executed, these cause the first of the sample requests (REQ 1) to be issued on path 14 (see FIG. 1). Recall that the REQ 1 signal causes the communications interface 15 to issue a REQ 2 signal on path 16 to operating system 20, which responds on path 18 with an operating state signal OS 1 which encodes the current OSC value for operating system 20. The communication interface 15 then provides a further operating state signal OS 2 on path 12 which also encodes the current OSC value. This sequence of signals may take anywhere from a few to several hundred milliseconds, which provides a window in which further processing may be done by microcontroller 23. Depending on this response time for supplying the operating state OS 2 signal, the instructions of box 164 may be placed in a different place i the sequence of instructions represented by the action boxes in FIG. 4.

Executing the first part of the instructions symbolized by action box 166 clears out the locations in raster memory 47 which control the luminance of the pixels in display screen 55 in which the image of FIG. 2 is formed. This activity is typically a function which is provided by a simple command to the Windows system. Executing the remainder of the instructions of action box 166 clears LLT 29.

The instructions symbolized by the remaining action boxes of FIG. 4 create the time scale 58 based on the previously loaded time scale parameters, and thus configure microcontroller 23 as time reference scale generator 45. The instructions of action box 169 form the line 107 by loading raster memory 47 with data altering the luminance of pixels in display screen 58 which are in the row between and including the pixels having the coordinates XOP, YOP and XOP+SL, YOP.

The instructions of action box 172 select the values (TP) of the major time points between times OT and OT+(SI×SD), which are the first and last times of the interval displayed by time scale 58. Recall that the product of the time between individual samples, SI and the number of samples displayed SD represents the total time interval for which OSC values are displayed in the graph. The algorithm by which individual values TP are chosen can be quite complex when the range of the time scale can, as is the case here, range between a few tens of seconds and perhaps several days. In general, it is preferable to chose values for TP which are values exactly divisible by 2, 5, 10, or multiples of 10 of these values. As mentioned earlier, this selection is beyond the scope of this disclosure. The individual values of TP are used to calculate appropriate X coordinates for the positions of the texts 103 displaying the TP values. The X AND Y coordinates we prefer for the bottom, left hand corner of the text for each TP value text 103 displayed is given by $$XOP-XTO+(TP-OT)SL/(SI\times SD),\ YOP-YTO.$$

The offset values XTO horizontally aligns approximately the center of the TP text with the associated time mark. The Y offset value prevents the TP text from lying directly on time scale 58. The text codes for the individual values of TP along with the associated X and Y coordinates are supplied to text insertion functions of the Windows environment and the raster memory 47 is automatically loaded with the data which creates the text images desired in display screen 55.

The instructions of action box 175 insert the time marks themselves at the X coordinate along line 107. The positions of the individual major time marks 106 can be calculated in exactly the same way that the time legend texts 103 are calculated. The X coordinate for each major time mark can be calculated as a function of the TP value, and equals XOP+(TP−OT)SL/-(SI×SD). The vertical length of each major time mark 106 can be arbitrary, perhaps the height of the time legend text.

The instructions of action box 178 insert the data in raster memory 47 which creates the minor time marks 105. Here too, there are a variety of approaches. One simple way to select the number and position of the minor time marks is to simply insert a single one between each pair of major time marks 106 if the pixel spacing between adjacent major time marks is at least some minimum value, say 20 pixels. After the instructions of action box 178 have been executed, then instructions symbolized by action box 123 in FIG. 3 are executed, as indicated by flow of the activity from action box 178 to connector A 120.

The major functions of this invention arise from the sample interrupt which occurs when the operating state OS 2 signal on path 12 arrives. The OS 2 signal encodes the OSC value which existed when the operating state of operating system 20 was sampled in response to the previously sent request REQ 1 signal on path 14. The sample interrupt causes the instructions of action box 123 to direct further instruction processing through the path of comment box 125 to connector B 145 and the instructions symbolized by FIGS. 5a-5c.

Figure 5A:
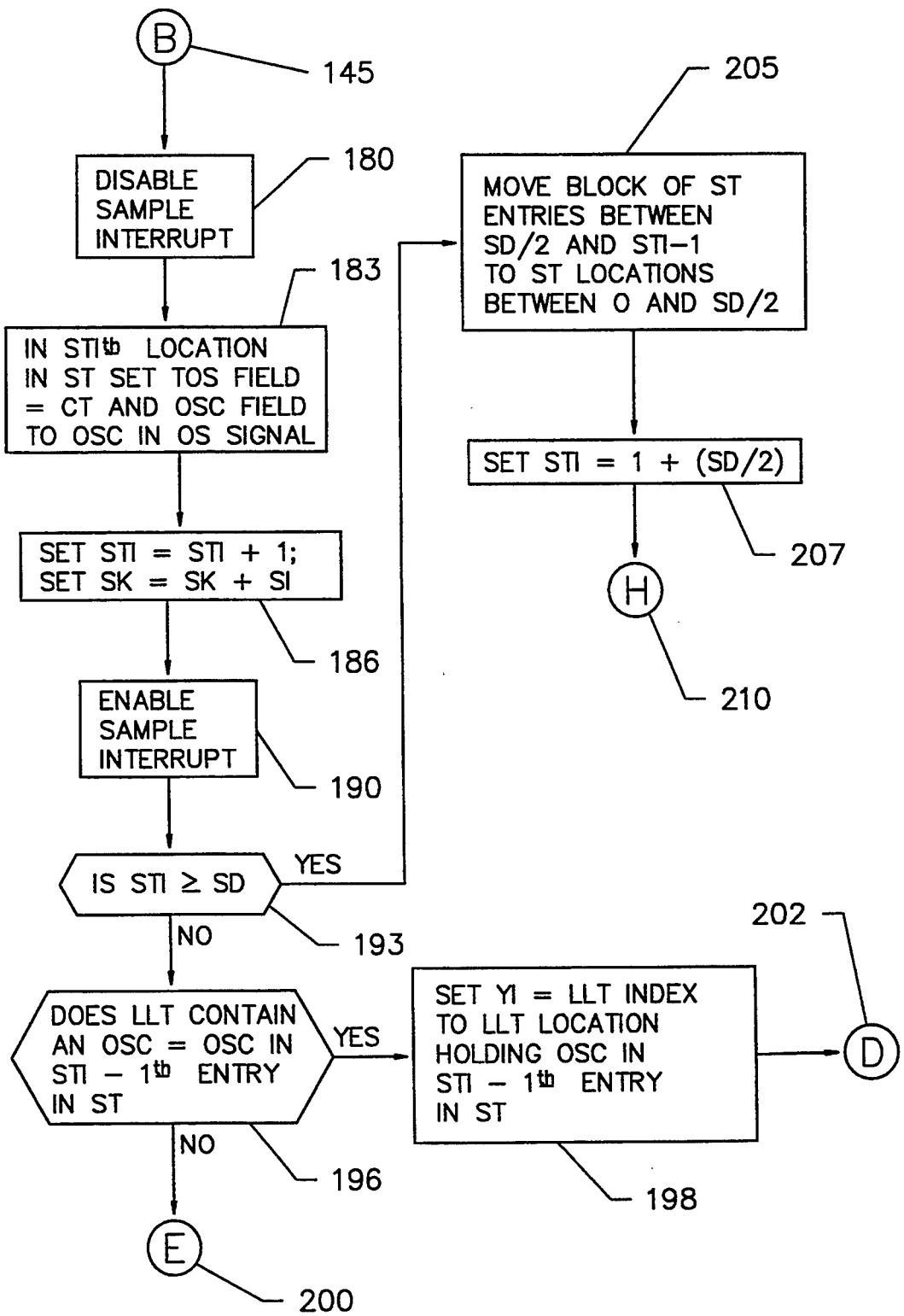
FIGS. 5a-5c form a flowchart defining software for configuring the microcontroller as elements for acquiring, recording, and displaying current operating state information.
Figure 5B:
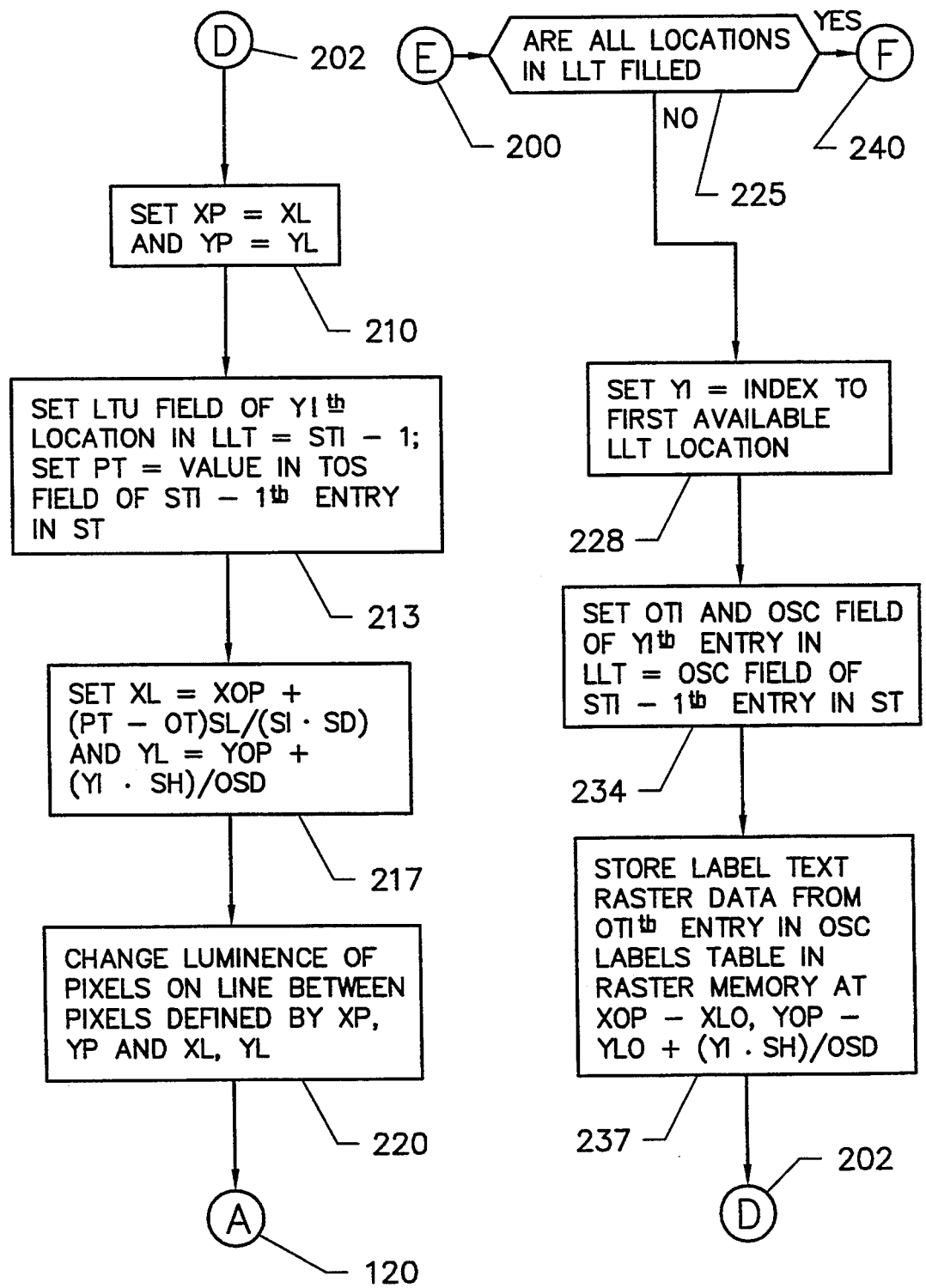
Figure 5C:
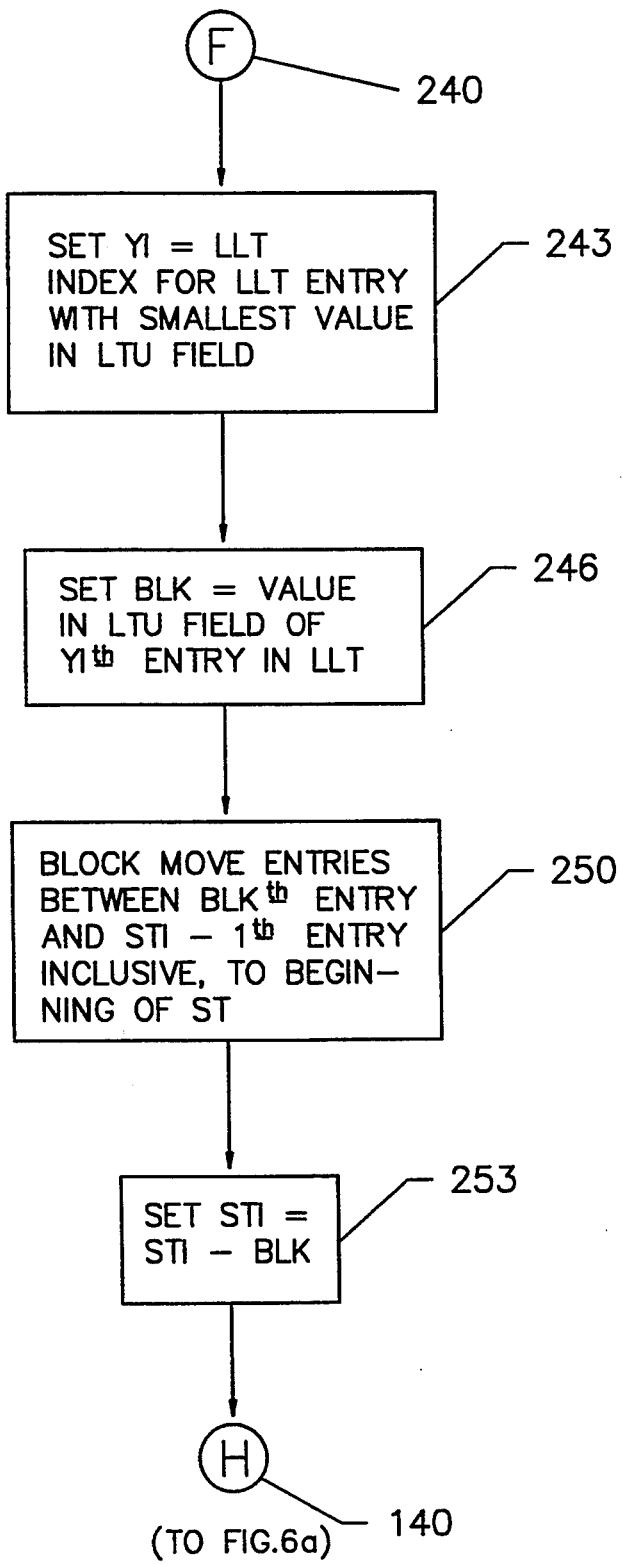

FIGS. 5a-5c are closely related and can be considered to implement a part of the functions of the state indicator 32. Connector B 145 indicates that instruction execution proceeds with action box 180. The instructions which action box 180 represents cause the sample interrupt to be disabled. This prevents another sample interrupt from occurring and causing the start of instruction execution at connector B 145 until the sample interrupt is again enabled.

The instructions for action box 183 read the OSC value provided by the OS 2 signal on path 12, and store this OSC value in the OSC field of the ST 33 entry specified by the STI. These instructions also store the current time value CT in the TOS field at this location in ST 33. Recall that the STI was originally set to zero by the instructions for action box 157 in FIG. 4. The instructions for action box 186 increment the STI by one, which causes the STI to specify the location in ST 33 for the next sample of the OSC. After these instructions are executed, the newest entry in ST 33 is stored at the location specified by STI−1. The action box 186 instructions also increment the SK value by the sample interval SI, to set the time for the next sample interrupt. Executing the instructions which action box 190 symbolizes causes the sample interrupt to be reenabled and ready for the next sample interrupt.

The instructions which decision box 193 represents test the value of the STI to see whether the STI is equal to or larger than the maximum number of samples SD to be displayed. SD is also the maximum number of sample values which can be stored in ST 33. When STI≧SD, this implies that there is no longer enough space in ST 33 or in the graph 60 to hold another OSC value. In this case, the time base of the graph must be shifted to open up the graph 60 and the ST 33 for new OSC samples. We prefer to shift the second (later) half of the ST 33 entries into the first half of ST 33, and this is the purpose of the instructions represented by action box 205. The instructions of box 205 generate a reset signal encoding an index value of SD/2 which defines the index to the location of the midpoint entry in ST 33. These instructions then cause microcontroller 23 to block transfer the ST 33 entries in the locations having indexes between SD/2 and the current value of STI−1 to the block of ST 33 locations starting with the location specified by an index having a reset value which typically is 0. The instructions of action box 205 and 207 configure microcontroller 23 as part of a reset means which in turn are part of the state indicator 32. The reset means generally changes the origin time for the history trace, in the case here because the ST 33 is filled. The instructions of action box 207 then reset the value of the STI to 1+(SD/2) which is the first available location in ST 33 after the block move caused by executing the instructions of box 205. The internal microcontroller 23 signal which encodes and transmits the value can be considered as a reset signal. This activity requires the history trace to be redrawn, the transfer of instruction execution represented by connector box H 210 to FIG. 6a.

But if the test in decision box 193 finds STI=SD, then the instructions of decision box 196 are executed next. The instructions represented by box 196 search LLT 29 to determine whether the OSC just loaded into the ST 33 from interface 15 is present in LLT 29. If this OSC is present in LLT 29, then the instructions which action element 198 symbolizes are executed next. These instructions set a Y index YI to the index of the entry in the LLT 29 which contains the OSC just loaded into ST 33 at the location specified by STI−1. YI is defined in Table II.

Instruction execution then continues at action box 210 as indicated by connector D 202 on FIGS. 5a and 5b. The instructions of box 210 cause the contents of the variable XP to be set equal to the current value stored in the variable XL, and the contents of the variable YP to be set equal to the current value stored in the variable YL (see Table II). Part of the instructions which action box 213 represent update the LTU field (see Table II) of the location in LLT 29 designated by YI. Another part of these instructions set a present time variable PT to the value in the TOS field of the location in ST 33 designated by STI−1.

Action box 217 symbolizes instructions which compute the X and Y coordinates of the point in the history trace defined by the latest sample. Action box 217 instructions set XL=XOP+(PT−OT)SL/(SI×SD)and YL=YOP+(YI×SH)/OSD (see Table I). Executing the instructions of action boxes 210 and 217 in essence produce an XY coordinate signal which specifies a pixel in the display screen 55 for each of the latest and the immediately preceding ST 33 entries. The latest ST 33 entry is of course specified by STI−1.

Action box 220 represents instructions which receive this XY coordinate signal and use the values encoded in it to alter the contents of the bit locations in raster memory 47 so as to change the luminance of the pixels forming a line between the pixel having the coordinates XP, YP and the pixel having the coordinates XL, YL. This line segment extends the history trace in a continuous fashion. As a practical matter, if this line segment is longer than two pixels, not all of the pixels defining this line need have their luminance changed in order to present the information of the history trace, but the appearance of it is better if it is continuous. When YP is unequal to YL, this implies that the OSC has changed since the previous sample was received. In this case the line connecting XP, YP and XL, YL is vertical or very nearly so, and this line links the parts of the history trace on two different of the lines 70–75. Thus when YP is unequal to YL, the instructions of action box 220 configure processor 23 as a linkage element for connecting the two parts of the history trace in different of the lines 70–75 in a continuous manner. Typically the Windows environment has this line-drawing capability as a resident function which can be invoked by the programmer with a simple call which designates the coordinates of the pixels defining the end of the line. This Windows function in this respect thus forms a part of this invention. These instructions complete the actions required to display another sample point on the history trace, and execution returns to the instructions at connector A 120 to await another sample or other type of interrupt.

If the search performed by decision box 196 did not reveal an OSC field in any of the LLT 29 entries equal to the OSC in the location in ST 33 designated by STI less 1, then instruction execution proceeds to connector E 200 which is the start of instructions for inserting in area 57 the label for the line 70–75 assigned to the OSC for the latest sample. It is necessary to first test whether all of the lines 70–75 have already been assigned to OSC values, and this is done by executing the instructions of decision box 225. If there are still locations in LLT 29, then the instructions for action box 228 are executed, which set the YI index to LLT 29 to the first available LLT location. Typically this will be the location having the smallest value of YI and which also has the value in its OSC field stored when the LLT 29 was cleared by the instructions of Action box 166 (FIG. 4).

The instructions of action box 234 set both an OTI index and the OSC field of the LLT 29 entry specified by YI to the OSC field of the STI−1th entry in ST 33. This is the latest sample of the operating state loaded from path 12 in the operating state OS 2 signal. Action boxes 234 and 237 together symbolize instructions which configure microcontroller 23 as a label text retrieval means and as a label insertion means. As a retrieval means, the instructions of boxes 234 and 237 retrieve from the OSC labels table 39, the label text data for the OSC value in the most recent sample encoded in the operating state signal. As the insertion means, the instructions of action box 237 cause microcontroller 23 to issue a display signal which stores the raster image retrieved from table 39 in the raster memory 47 at locations relative to the pixel having the X coordinate XOP−XLO and the Y coordinate YOP+(YI×SH/OSD). Tables I and II define each of the variables in these expressions. After the instructions of action box 237 have been executed, instruction execution continues at action box 210 as symbolized by the flow path from action box 237 to connector D 202.

If the decision box 225 instructions cause microcontroller 23 to determine that all of the locations in LLT 29 are filled with OSC values, then instruction execution proceeds on the path indicated by connector F 240 to FIG. 5c. FIG. 5c contains the flow chart elements symbolizing the instructions which remove from LLT 29 and from graph 60 generally, the OSC whose last occurrence is earlier than for any of the other OSCs. Executing the instructions of action box 243 sets the YI index to designate the LLT 29 entry which has the smallest value in the LTU field, which is also the earliest entry in the LLT 29 (because the STI is incremented each time a new sample is received on path 12). YI is set to this value by the instructions which action box 243 represents.

The instructions of action box 246 sets the BLK index to the value stored in the LTU field of the LLT 29 entry indexed by YI. Action box 250 designates a group of instructions which cause a move, to the beginning of ST 33, of the block of entries in ST 33 starting with the location designated by the BLK index to the location designated by STI−1 inclusive. This move eliminates all of the entries in ST 33 whose OSC field contents equals the contents of the OSC field in the LLT 29 location whose LTU field contents was smallest (earliest). The block transfer in effect changes the origin time OT for a new history trace to the TOS field value of the first ST 33 entry after the block move, which is the same ST 33 entry designated by the BLK index at the time the execution of instructions for action box 243 began. It cannot be predicted from the LLT 29 contents only which of the ST 33 entries contains the new origin time. The operations of FIG. 5c allows the user opportunity to see as much of the history trace for earlier samples as is possible given the physical resources for displaying graph 60 which are available.

Figure 6A:
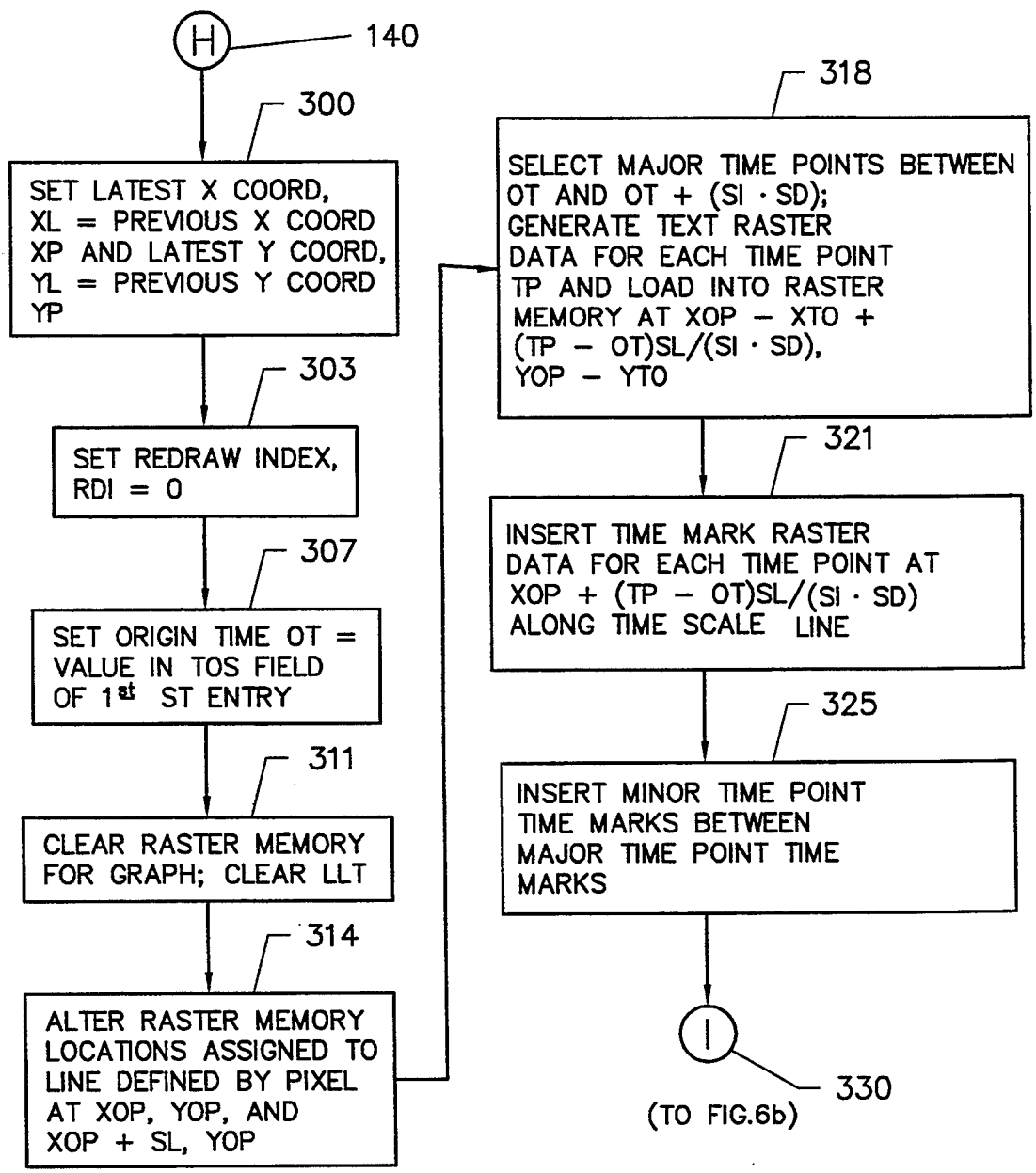
FIGS. 6a-6c form a flowchart defining software for configuring the microcontroller as an element for redrawing the image presented by this invention in certain circumstances.
Figure 6B:
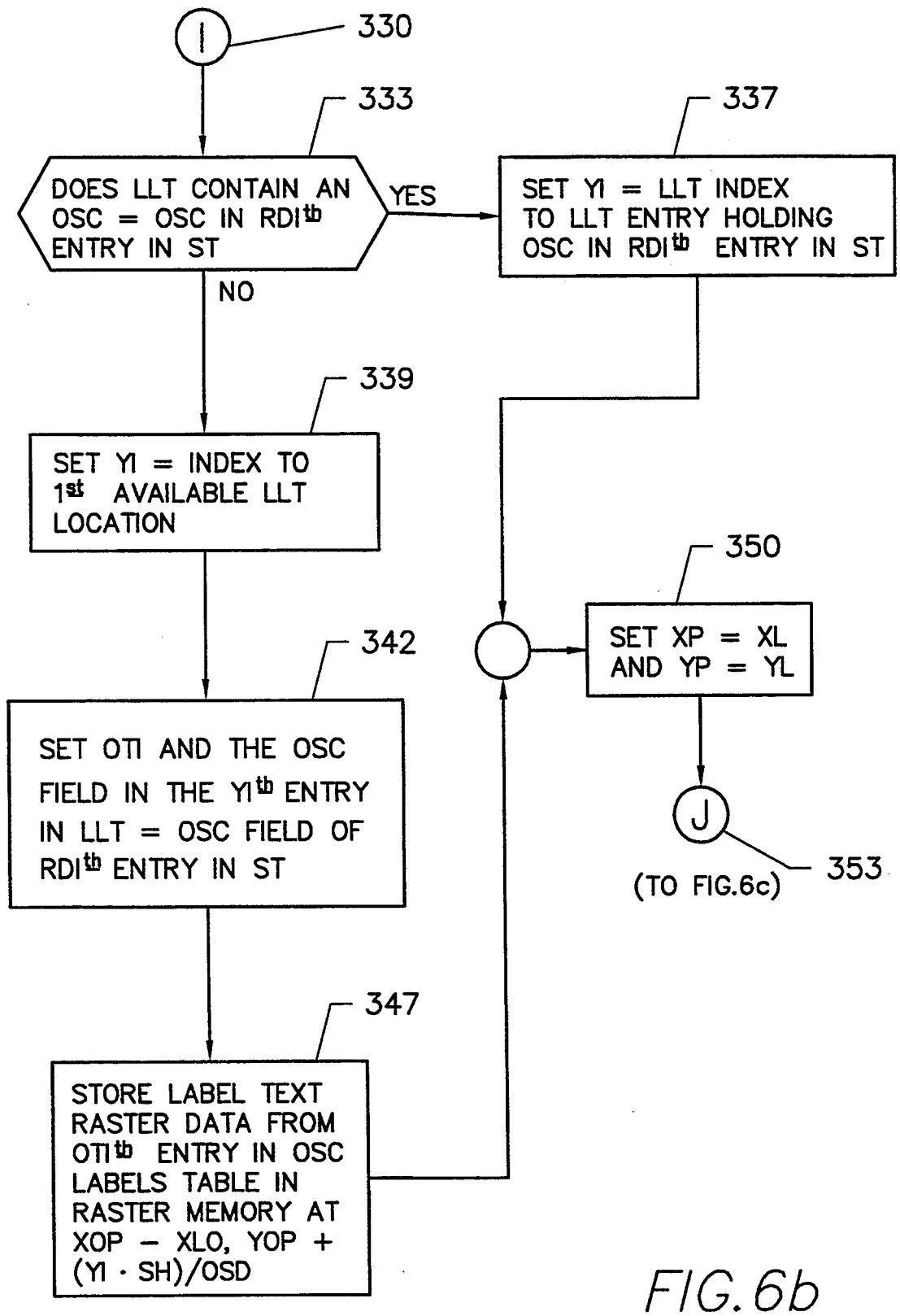
Figure 6C:
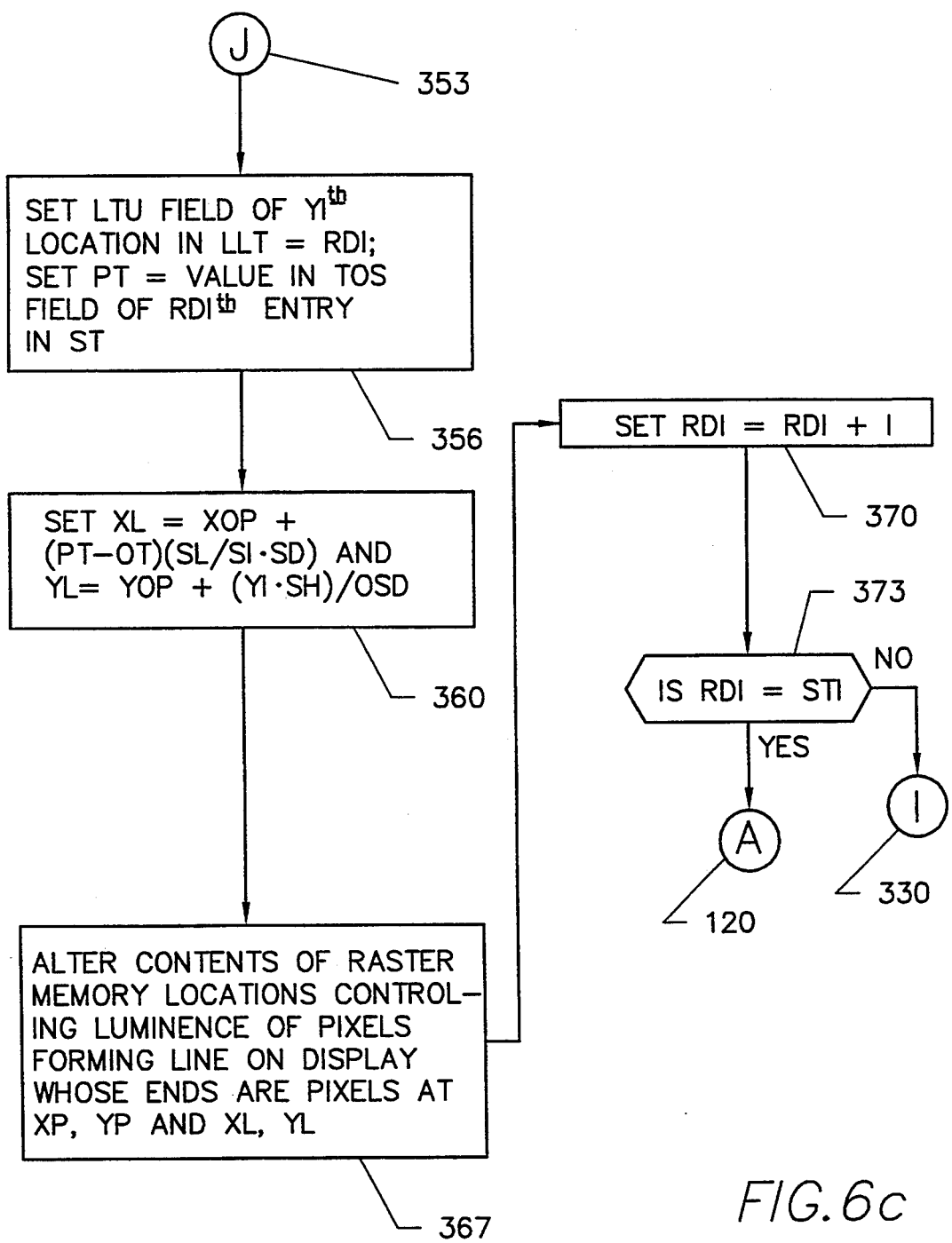

The instructions which the boxes of FIGS. 6a–6c represent create the history trace based on the newly modified data in ST 33. Many of the operations performed by these instructions are similar or identical to operations of FIGS. 4 and 5a–5c. In such cases there will be only a brief reference to the similar flow chart box in FIGS. 4 and 5a–5c, along with an explanation of any differences between the two operations. Indeed, it is entirely possible to use call procedures to a single routine which performs the function of a particular action box, thereby requiring only one copy of its instructions to be present in the software. However, we feel that the invention is easier to understand if these action boxes are replicated in the flow chart and the discussion of them simply shortened.

The re-creation of the graph done by the instructions of FIGS. 6a–6c start at connector H 210. Each of the paths leading to connector H 210 which starts processing has already configured ST 33 so that the graph 60 can be formed without further changes in ST 33.

It is first necessary to perform a number of setup operations to prepare the processor for re-creating the graph 60. The processing of the action box 300 instructions set the XL and YL coordinate values to the XP and YP coordinate values, i.e. the latest coordinate values are set to the previous values. This prestore step permits the proper values to be loaded into XP and YP later in the instruction sequence as the proper previous coordinate set for the first history trace segment. The execution of the instructions of action box 303 sets a redraw index RDI value to one.

The origin time held in the OT variable of the history trace is set to the contents of the TOS field in the first entry in ST 29 by the instructions of action box 307. This function relates to the origin time selector element 40 of FIG. 1.

The instructions of action box 311 clears the old image from the raster memory 47 and clears the LLT 29, and is exactly analogous to action box 166 of FIG. 4. ST 33 at this point contains valid sample information concerning previous operating states which is to be displayed on screen 55, so there is no need to make in changes in it.

The instructions of action box 314 form the image of line 107, and are similar to and have the same function as those of action box 169 (FIG. 4). The action boxes 172, 175, and 178 of FIG. 4 are also similar to action boxes 318, 321, and 325 respectively of FIG. 6a, and the explanation of their functions are exactly the same. After the operations represented by action box 325 have been completed, instruction execution passes through connector I330 to decision box 333 on FIG. 6b.

Decision box 333 is the start of a software loop which inserts a point in the history trace for each entry in ST 33. Whereas in FIGS. 5a–5c the STI was used as the index to the ST 33 for designating the current OSC value and sample time for it, in the graph re-creation operation, the RDI is used as the ST index and is varied between one and STI−1 inclusive in this loop. The use of RDI corresponds to the use of STI−1 in FIGS. 5a–5c.

Decision box 333 is analogous to decision box 196 in FIG. 5a, which is part of the setup of the LLT 29 which specifies the line labels in area 57 of graph 60. The explanation for the operation of the instructions for both boxes 196 and 333 is identical.

Action box 337 symbolizes instructions corresponding to action box 198 in FIG. 5a and which set the YI index to designate the LLT location holding the information pertaining to the OSC value in the ST 33 entry whose value is currently being entered in the history trace. If the path from decision box 333 is to action boxes 339, 342, and 347, then this means that the OSC of the ST entry specified by RDI is not yet present in LLT 29. The instructions of action boxes 339, 342, and 347 duplicate respectively the functions of action boxes 228, 234, and 237 in FIG. 5b. These two sets of action boxes insert a new OSC value in LLT 29 and create the label image in the proper location of area 57 so as to label the line 70–75 with the operating state assigned to it.

Executing the instructions of action boxes 350 (FIG. 6b) and 356, 360, and 367 (FIG. 6c) respectively duplicates the functions of action boxes 210, 213, 217, and 220 of FIG. 5b. Since the index used for designating the locations of ST 33 is RDI rather than STI−1, RDI is used in action box 356 rather than STI−1 as in action box 213.

Action box 370 increments RDI to designate the next entry in ST 33. Decision box 373 then tests this new value of RDI to see if it equals STI. If these lo values are equal, instruction execution returns to interrupt processing box 123. If these values are unequal, at least one sample from ST 33 remains to be entered into the history trace, and instruction execution passes from decision element 373 to decision box 333 through connector I 330. The loop between connector I330 and decision box 373 is repeated until all of the currently valid entries in ST 33 have been entered into the history trace. Processing then continues with individual samples as they are received from the interface 15.

The embodiment of the invention in which an exclusive property or right is claimed are defined as follows:

1. A display system for displaying the operating state history of an operating system having first through at least second different and mutually exclusive operating states and changing from one operating state to another at uncertain times, each of said operating states defined by an associated unique value encoded in an operating state signal supplied in real time by the operating system, said display system comprising a) a display screen comprising an orthogonal matrix of pixels for forming a raster image by altering the luminance of individual pixels, said screen receiving a raster signal and displaying for each pixel in the raster image, the luminance specified in the raster signal by a bit value assigned to that pixel;

b) a raster memory comprising a plurality of bit storage locations each of which is assigned to a predetermined pixel in the raster image and records a bit value assigned to that pixel, said raster memory recording values in the individual bit locations as specified by a display signal supplied to the raster memory, and providing the raster signal encoding the bit values recorded in the bit locations, and further, a portion of the bit locations in the raster memory being grouped in first through at least third pluralities, with all bit locations in the first plurality assigned to pixels aligned in a first approximately straight line in the raster image, and with all bit locations in the second through at least third pluralities assigned to pixels aligned respectively in second through at least third approximately straight lines in the raster image, with said second through at least third approximately straight lines parallel to the first approximately straight line;

c) a clock providing a clock signal specifying the present time of day;

d) origin time means for generating an origin time value and for issuing an origin time signal encoding the origin time value;

e) a time reference line generator means receiving the origin time signal, for providing to the raster memory a display signal i) encoding values setting bit locations to predetermined values within the raster memory assigned to pixels of the first plurality, said pixels having preassigned positions in the raster image and forming time marks therein, and ii) encoding values setting bit locations to predetermined values within the raster memory assigned to pixels which form adjacent to a time mark a text image spelling out the origin time value, said origin time value and said time marks together defining a time scale representing a time interval within which is included the present time of day;

f) a label generator means for providing to the raster memory a display signal encoding values setting to predetermined values within the raster memory, bit locations assigned to pixels which form adjacent to each of the second through at least third straight lines a text image spelling out for each of the second through at least third lines an operating state name; and g) a state indicator means receiving the operating state signal and the clock signal, for providing to the raster memory a display signal encoding values setting selected bit locations in the second through at least third pluralities to preselected values as a function of the present values encoded in the clock signal and the operating state signal.

2. The display system of claim 1 wherein the first through at least third pluralities of bit locations in the raster memory are assigned respectively to first through at least third rows of pixels in the raster image and the second and third rows of pixels are associated respectively with the first and second operating states, wherein columns of pixels in the raster image intersect the first through at least third rows of pixels with each column of pixels associated with a time in the time scale of the first row, and wherein the state indicator means comprises means for providing to the raster memory a display signal setting to preselected values bit locations of the second plurality which are also in columns of bits associated with times in the time scale during which the first operating state exists.

3. The display system of claim 2, wherein the state indicator means further comprises means setting to the preselected values bit locations of the third plurality which are also in columns of bits associated with times in the time scale during which the second operating state exists.

4. The display system of claim 3, wherein the state indicator means further comprises linkage means receiving the operating state signal, for providing to the raster memory a display signal setting to preselected values each bit in a column of bits between the second and third row of bits responsive to a change in the state signal during the time with which the column of bits is associated.

5. The display system of claim 3, wherein the operating system periodically supplies a sample of the operating state in the operating state signal, and wherein the state indicator means comprises a) a sample table index register recording a sample table index, changing the sample table index responsive to a sample table index control signal, and providing a sample table index signal encoding the sample table index;

b) sample storage means receiving the clock signal and the operating state signal, for recording the operating state value in each operating state signal along with the time value in the current clock signal in a sample table at the location specified by the sample table index; and c) reset means receiving the sample table index signal, for providing a reset signal encoding a selected index value between 0 and the value encoded in the sample table index signal, for transferring at least some of the block of sample table entries specified by index values between the index value in the reset signal and the value encoded in the sample table index signal to the block of sample table locations beginning with a predetermined reset index value, and for supplying a sample table index control signal to the sample table index register setting the sample table index to a value which is a function of the reset index value, the current sample table index value, and the index value encoded in the reset signal.

6. The display system of claim 5, wherein the reset means further comprises means receiving the operating state signal, for issuing a sample table index control signal incrementing the sample table index by a preselected value responsive to an operating state sample in the operating state signal, and for issuing a reset signal responsive to the value in the sample table index signal exceeding a preselected value.

7. The display system of claim 6, wherein the origin time means comprises means for setting the origin time value to the time value in a preselected entry in the sample table, and wherein the state indicator means comprises a) means for issuing an XY coordinate signal encoding an X and a Y coordinate specifying for each entry in the sample table between the preselected entry and the entry specified by the value encoded in the sample table index signal, a pixel in the display screen, said X and Y coordinates calculated for each of said sample table entries as a function of the operating state code and the time value recorded in the entry; and b) means receiving the XY coordinate signal, for issuing a display signal altering the values in the bit locations assigned to the pixels defined by the XY coordinate signal, and for altering the values of the bit locations assigned to at least some of the pixels lying on the line between each pair of pixels specified by the X and Y coordinates calculated for adjacent sample table entries.

8. The display system of claim 7, wherein the raster memory is grouped in n+1 pluralities of bit locations, and wherein the origin time means comprises origin reset means for resetting, responsive to presence of more than n different values of operating state codes in the sample table, the origin time to a value later than the time value in the earliest sample table entry in which is recorded an operating state code which does not occur in a later sample table entry.

9. The display system of claim 8, wherein the sample storage means includes means for recording as a latest time used value for each of the first through n+1th pluralities of bit locations, the last time at which the operating state assigned to the plurality of bit locations occurred, and wherein the origin reset means comprises means for setting the origin time to a time later than the earliest of the latest time used values.

10. The display system of claim 6, wherein the origin time means comprises means for setting the origin time value to the time value in the sample table entry specified by the reset index value.

11. The display system of claim 3, wherein the label generator means further comprises a) label text retrieval means receiving the operating state signal, for providing a label signal encoding bits forming first through at least second label text raster images associated with each of the first through at least second operating states responsive respectively to the associated operating state signal value; and b) label insertion means receiving the label signal for providing a display signal encoding values which set in the raster memory, bit locations assigned to pixels adjacent to the pixels aligned in the second through at least third straight lines respectively to the bits forming the first through at least second label text raster images.

12. The display system of claim 11, wherein the state indicator means maintains in the raster memory an indexed line label table containing first through at least second operating state codes assigned respectively to the second through at least third straight lines; and wherein the label insertion means further comprises means setting bit locations assigned to pixels whose Y coordinates are a function of the index to the location of the operating state code in the line label table whose assigned text is associated with the operating state code.

* * * * *